United States Patent [19]
Arora et al.

[11] Patent Number: 6,119,218
[45] Date of Patent: Sep. 12, 2000

[54] METHOD AND APPARATUS FOR PREFETCHING DATA IN A COMPUTER SYSTEM

[75] Inventors: Judge K. Arora, Cupertino; Jack D. Mills, San Jose; Jerome C. Huck, Palo Alto, all of Calif.

[73] Assignee: Institute for the Development of Emerging Architectures, L.L.C., Cupertino, Calif.

[21] Appl. No.: 09/349,839

[22] Filed: Jul. 8, 1999

Related U.S. Application Data

[62] Division of application No. 09/001,548, Dec. 31, 1997, Pat. No. 5,948,095.

[51] Int. Cl.$^7$ ........................................................ G06F 9/38

[52] U.S. Cl. ............................................. 712/207; 712/244

[58] Field of Search ................................... 712/200, 207, 712/244; 711/122, 117, 137

[56] References Cited

U.S. PATENT DOCUMENTS

| | | | |
|---|---|---|---|
| 5,615,386 | 3/1997 | Amerson et al. | 712/238 |
| 5,664,135 | 9/1997 | Schlansker et al. | 712/201 |
| 5,704,053 | 12/1997 | Santhanam | 712/207 |
| 5,732,242 | 3/1998 | Mowry | 711/136 |
| 5,778,423 | 7/1998 | Sites et al. | 711/118 |
| 5,796,971 | 8/1998 | Emberson | 712/207 |
| 5,838,945 | 11/1998 | Emberson | 712/200 |
| 5,966,734 | 10/1999 | Mohamed et al. | 711/173 |

*Primary Examiner*—William M. Treat
*Attorney, Agent, or Firm*—Blakely Sokoloff Taylor & Zafman, LLP

[57] ABSTRACT

A method and apparatus for prefetching data in a computer system that includes a processor. A prefetch instruction is executed and, in response, data is prefetched from a memory location. It is determined if a memory exception occurred during the prefetching of the data. If a memory exception occurred, the exception is handled if the prefetch instruction indicates to do so.

18 Claims, 3 Drawing Sheets

METHOD AND APPARATUS FOR PREFETCHING DATA IN A COMPUTER SYSTEM

This application is a divisional of U.S. patent application Ser. No. 09/001,548, now U.S. Pat. No. 5,948,095.

FIELD OF THE INVENTION

The present invention relates to computer systems and more particularly to prefetching data from a memory location in a computer system.

BACKGROUND OF THE INVENTION

A processor is commonly considered to be the "brains" of a computer system. Increasing the speed of the processor will tend to increase the computational power of the computer, and many methods are employed to increase processor speed to create more powerful computers for consumers. A processor retrieves and manipulates data under the control of software to obtain a desired result, so increasing the processor's data retrieval speed is one way to achieve overall increased processing speed. One method for increasing a processor's data retrieval speed is called "prefetching."

A computer system includes different banks of memory locations arranged in a memory hierarchy. Memory locations that are more quickly accessible by the processor are typically considered to be "closer" to the processor in the memory hierarchy. Memory locations that take longer for the processor to access are considered to be "further" from the processor. Prefetching is a method in which data that is stored in one memory location of the memory hierarchy is transferred to a memory location that is closer to the processor. This transfer occurs before the data is actually needed by the processor. In this manner, the data can be more quickly retrieved by the processor when it is needed, thereby increasing the processor's overall processing speed.

For example, in many computer systems a first level of memory closest to the processor is called an L0 cache. An L0 cache is typically located on the same semiconductor substrate as the processor, making data retrieval from the L0 cache by the processor very simple and quick. The next level of memory further from the processor is an L1 cache. An L1 cache may be located in the same package as the processor, but on a separate semiconductor substrate, making data retrieval from the L1 cache somewhat more difficult and time consuming. L2, L3 and higher cache levels, when used, are memory banks located progressively further from the processor and exhibit respective increased delays in data retrieval. Main memory is typically further from the processor in the memory hierarchy than any cache, and the disk drive is located even further from the processor than the main memory.

A prefetch instruction instructs the processor to prefetch data from one memory location, such as the L1 cache, and to store it in a memory location that is closer to the processor, such as the L0 cache. A load instruction instructs the processor to load data from a memory location, such as the L0 cache, into a processor register for further manipulation of the data by the processor. Ideally, a load instruction is preceded by an associated prefetch instruction. The prefetch brings the data closer to the processor so that the load is more quickly executed. During or after a computer programmer writes the program code of a software application, the programmer inserts prefetch instructions before (i.e. earlier in the program sequence) load instructions to improve the speed of the loads. Alternatively, intelligent compilers modify the program code in the same manner.

Instructions in a program code for a processor that does branch prediction are either speculative or non-speculative. Speculative instructions are instructions that reside after (i.e. later in the program sequence) a branch instruction and are executed, or not executed, depending on whether the branch is taken or not taken (assuming the program is not otherwise interrupted). A branch is taken if a variable is calculated to be a predetermined value. Non-speculative instructions are executed regardless of whether a previous branch is taken or not taken.

If, during a prefetch, a memory exception occurs such as a translation lookaside buffer miss, the exception is ignored and the data is not stored in the new memory location closer to the processor. This is fine if a subsequent, speculative load instruction is never executed by the processor. If the load instruction is subsequently executed, however, the time-consuming exception is then handled upon reaching the load instruction, and the data is loaded from the more remote memory location. This wastes valuable time retrieving the data instead of manipulating it.

To remedy this situation, a programmer can replace the prefetch instruction with a load instruction, effectively moving the load instruction earlier in the programming sequence, if the load instruction is non-speculative. The problem with this approach is that a processor register is wasted storing data before the data is needed. Wasting a register in this manner can reduce processing efficiency.

SUMMARY OF THE INVENTION

A method and apparatus is described for prefetching data in a computer system that includes a processor. A prefetch instruction is executed and, in response, data is prefetched from a memory location. It is determined if a memory exception occurred during the prefetching of the data. If a memory exception occurred, the exception is handled if the prefetch instruction indicates to do so.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus is described for prefetching data in a computer system. The computer system includes a processor, a memory location, and a cache wherein the cache is located closer to the processor in the memory hierarchy of the computer system than the memory location.

During the execution of program code, the processor encounters a prefetch instruction before it encounters a load instruction associated with the same data. The prefetch instruction instructs the processor to prefetch the data from the memory location and to store the data in the cache. The prefetch instruction also indicates whether the processor should handle or ignore any exception resulting therefrom. In response, the data is prefetched from the memory location and any memory exception that occurs, such as a translation lookaside buffer (TLB) miss, is either handled or ignored based on the indication from the prefetch instruction. The data may then be stored in the cache. Subsequently, the processor encounters the associated load instruction that instructs the processor to load the data from the cache into a processor register.

In accordance with an embodiment of the present invention, a prefetch instruction that indicates to handle an exception (called a faulting prefetch instruction) is inserted into program code, by a programmer or a compiler, before a non-speculative load instruction associated with the same data. In this manner, time consuming memory exceptions are handled before the load instruction is encountered, and the data is relocated closer to the processor to reduce data retrieval latency. As a result, the amount of time the processor must wait for the data upon executing the load instruction is reduced, thereby increasing processing speed. In addition, processor registers are not wasted by the faulting prefetch instruction because the data is transferred into a cache rather than into a processor register.

In contrast, a prefetch instruction that indicates to ignore an exception (called a no-fault prefetch instruction) is inserted into program code, by a programmer or a compiler, before a speculative load instruction associated with the same data. In this manner, the data is relocated closer to the processor only if time consuming memory exceptions do not occur. As a result, time is not wasted on handling memory exceptions for the prefetching of data that may never be needed.

A more detailed description of the present invention, including various configurations and implementations in accordance with alternate embodiments of the present invention, is provided below.

Figure 1:
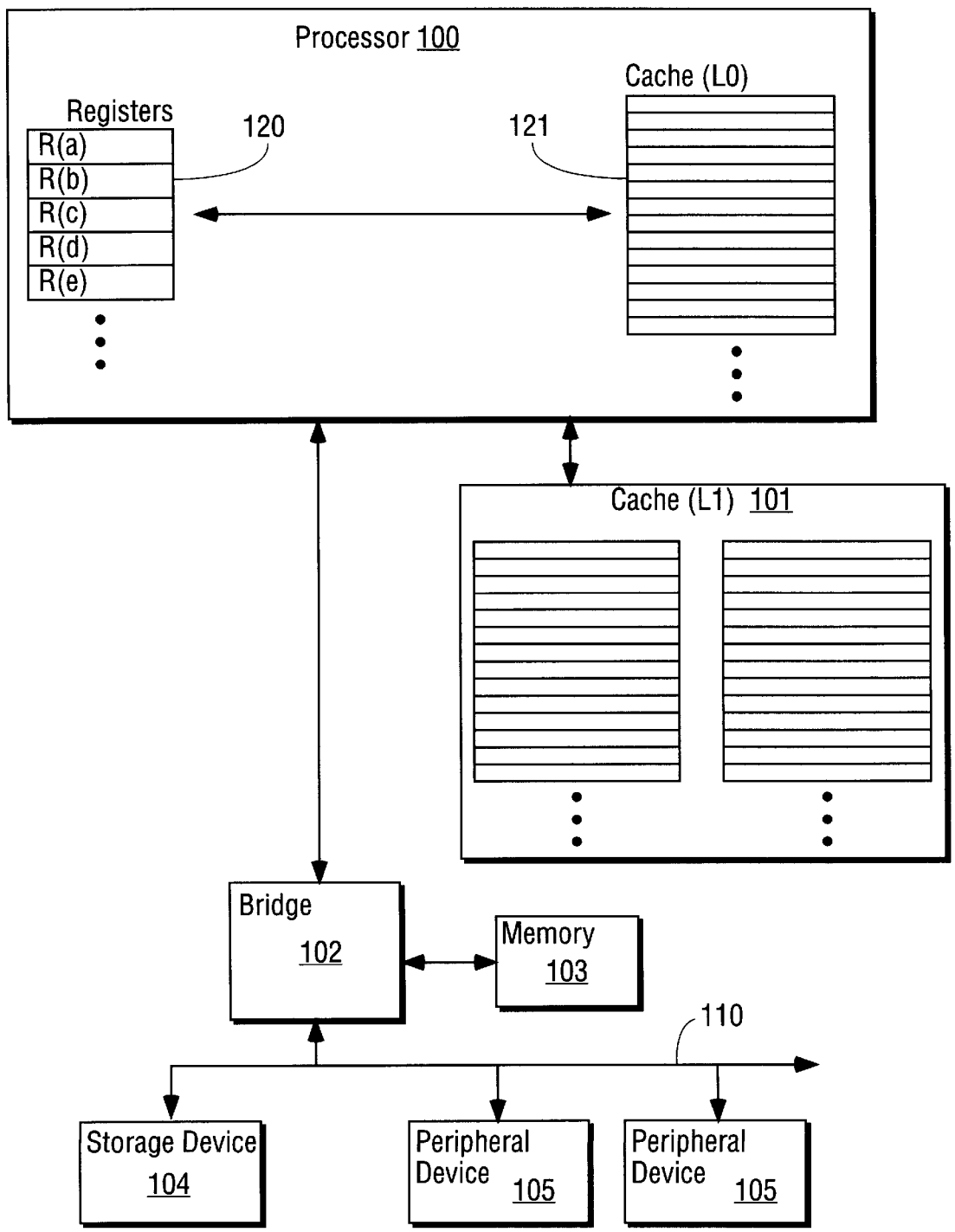
FIG. 1 is a computer system formed in accordance with an embodiment of the present invention.

FIG. 1 is a computer system formed in accordance with an embodiment of the present invention in which processor 100 includes a set of registers 120 and an L0 cache 121. The processor is coupled to an external L1 cache 101. The processor is also coupled to bridge 102 which is coupled to memory 103 and bus 110. Peripheral devices 105 are coupled to bridge 102 via bus 110, as is storage device 104.

Processor 100 of FIG. 1 includes circuitry to transfer data between registers 120 and L0 cache 121. Because L0 cache 121 is a dedicated bank of memory locations located inside processor 100, the transfer of data between registers 120 and L0 cache 121 can be done across a very wide, short, high speed bus. As a result, loading data from L0 cache 121 into one of registers 120 occurs very quickly. In contrast, L1 cache 101, though dedicated to processor 100, requires that communication with the processor be conducted across a longer, narrower bus, with bus interface circuitry slowing the link between the two devices. As a result, loading data from L1 cache 101 into one of registers 120 occurs more slowly than loading data from L0 cache 121 into registers 120.

The memory storage capacity of L1 cache 101 of FIG. 1, however, is much larger than L0 cache 121. It is the nature of this computer system memory hierarchy that although memory banks located progressively further from the processor are progressively slower for the processor to access, the memory banks have progressively larger memory storage capacities.

Memory 103 of FIG. 1 is further from processor 100 than both L0 cache 121 and L1 cache 101, and it takes longer for processor 100 to load data from memory 102 than from either the L0 or L1 caches. The memory storage capacity of memory 103, however, is larger than the capacity of either L0 cache 121 or L1 cache 101. For one embodiment of the present invention, memory 103 is the main memory of the computer system and comprises dynamic random access memory (DRAM) technology while L0 and L1 caches, 121 and 101, comprise static random access memory (SRAM) technology.

Storage device 104 of FIG. 1 is located further from processor 100 in the memory hierarchy than memory 103. Storage device 104 takes longer for processor 100 to access, but the storage device has a much larger memory capacity than memory 103. For one embodiment of the present invention, storage device 104 is an electronic storage medium such as a floppy disk, hard drive, CD-ROM, or digital versatile disk (DVD).

In accordance with the embodiment of the present invention shown in FIG. 1, before necessary data is loaded from L0 cache 121 into one of registers 120, the data is prefetched from L1 cache 101 and stored in L0 cache 121. For an alternate embodiment of the present invention, data is prefetched from any other memory location in the memory hierarchy of the computer and is stored in a memory location closer to the processor. For example, data may be prefetched from memory 103 and stored in L1 cache 101, or prefetched from memory 103 and stored in L0 cache 121, or prefetched from storage device 104 and stored in L1 cache 101. For an alternate embodiment of the present invention, one or more additional levels are included in the memory hierarchy of the computer system, such as an L2 cache or a network storage device. For another embodiment, fewer levels are included.

In accordance with one embodiment of the present invention, processor 100 of FIG. 1 executes a faulting prefetch instruction before it executes a load instruction associated with the same data. In response, the processor prefetches the data, determines if a memory exception occurred during the prefetch, and if so, handles the exception. A memory exception is an obstacle to successfully completing the prefetch. "Handling the exception" means that steps are taken to overcome the obstacle by, for example, reporting the exception or vectoring to the appropriate exception handler so that a software algorithm can overcome the obstacle and return control back to the processor to complete the prefetch instruction. By handling the exception, the data is stored in a cache that is closer to the processor than the memory location from which the data was prefetched. As used herein, executing a prefetch instruction (either faulting or no-fault) means that the prefetch instruction, although executed, may or may not be completed depending on whether a memory exception is successfully handled.

For example, for one embodiment of the present invention, data is prefetched from L1 cache 101 of FIG. 1 whereupon a translation lookaside buffer (TLB) miss is encountered. A TLB miss is a memory exception in which the virtual address that is the target of the prefetch is not stored in the TLB address translation table (or it has been invalidated). This table provides the translation between the virtual address and the physical address that gives the physical location of the target data. The TLB miss is handled by transferring a valid, updated address translation into the TLB, thereby removing the obstacle, and re-attempting the prefetch. This can be handled either by hardware or by transferring to a software exception handler. The data is then prefetched from the L1 cache, translating the virtual address to a physical address using the updated TLB, and storing the data in L0 cache 121. For one embodiment of the present invention, the valid address translation is transferred from memory 103 into L1 cache 101. For an alternate embodiment, the valid address translation is transferred from a higher level cache. For another embodiment in which the present invention is implemented in a multiprocessor system, the valid address translation is transferred from a cache that is dedicated to an alternate processor.

In accordance with one embodiment of the present invention, after the memory exception is handled, and the prefetched data is stored in L0 cache 121 of FIG. 1, processor 100 executes a load instruction associated with the same data. In response to this load instruction, the processor transfers the data from L0 cache 121 to registers 120. Once the data is in a register, processor 100 manipulates the data as desired by the user. For example, after the data has been loaded into a register, the processor may execute a mathematical instruction that performs a mathematical operation on the data.

Figure 2:
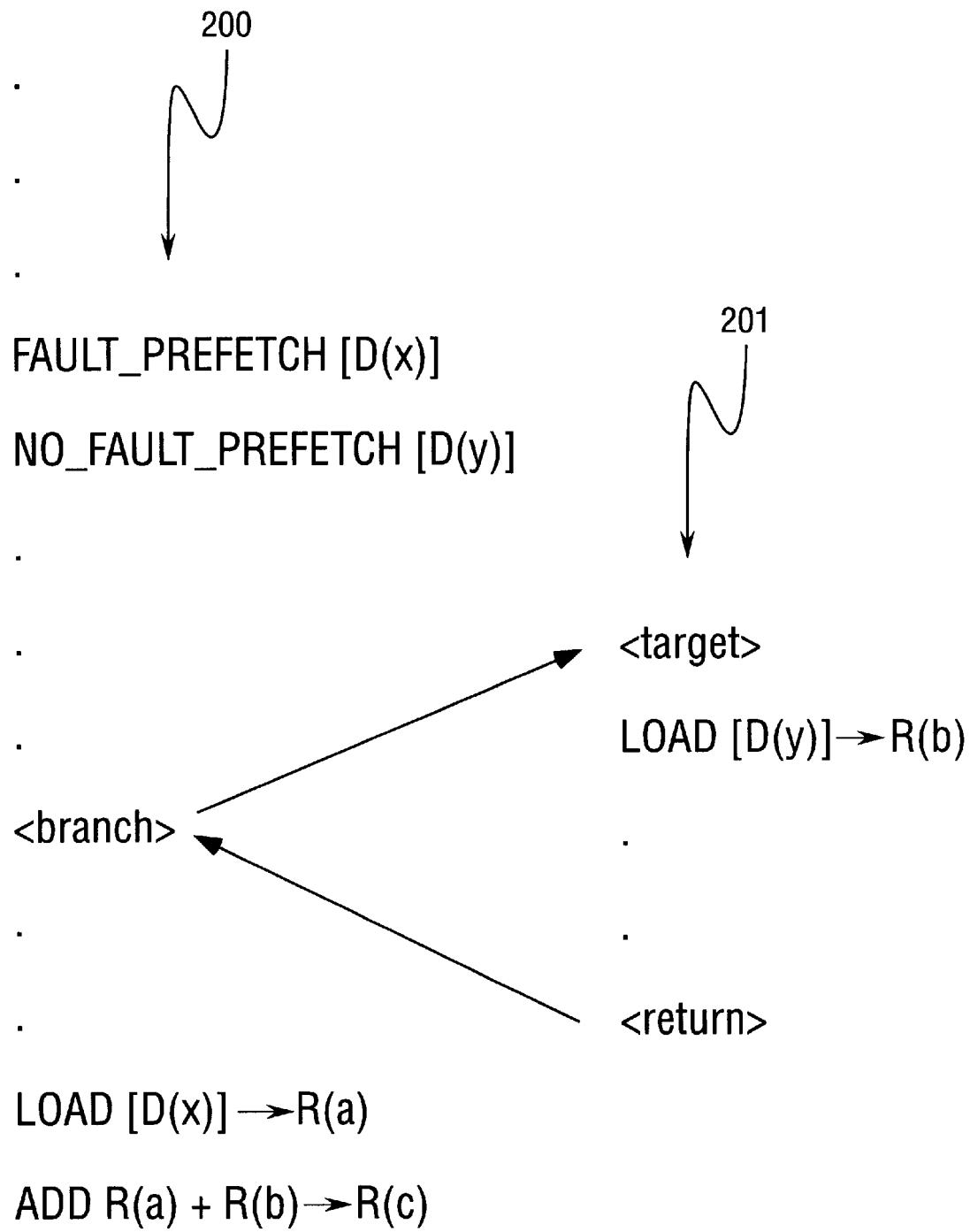
FIG. 2 is a portion of program code in accordance with an embodiment of the present invention.

FIG. 2 is a portion of program code in accordance with an embodiment of the present invention. The program code of FIG. 2 has been written for a processor having an instruction set that accepts both faulting prefetch instructions and no-fault prefetch instructions. Program code lines 200 are a portion of a program sequence of one routine, and program code lines 201 are a portion of a program sequence of a subroutine. The execution of subroutine 201 is contingent on whether or not the branch of routine 200 that calls the subroutine is taken or not taken. If taken, the program sequence branches to the target at the beginning of subroutine 201, and the processor executes the instructions of subroutine 201 until the program sequence is directed to return back to routine 200. If not taken, the instructions of subroutine 201 are not executed and the processor continues executing the instructions of routine 200.

If the branch of FIG. 2 is taken, the load instruction LOAD[D(y)]→R(b) of subroutine 201 is executed, otherwise the load instruction is not executed. Load instruction LOAD[D(y)]→R(b) loads the data that resides at address D(y) into register R(b) of the processor. This load instruction is speculative because its execution is contingent on whether or not the previous branch instruction of routine 200 is taken.

In contrast, the load instruction LOAD[D(x)]→R(a) of FIG. 2 is non-speculative because this instruction is executed regardless of whether or not the branch of routine 200 is taken. If the branch is taken, the program sequence is directed to subroutine 201 but is returned back to routine 200 at a point before load instruction LOAD[D(x)]→R(a). If the branch is not taken, the load instruction is executed as part of the normal program sequence of routine 200. Load instruction LOAD[D(x)]→R(a) loads the data that resides at address D(x) into register R(a) of the processor.

In accordance with one embodiment of the present invention, the data retrieval speed of the two load instructions of FIG. 2 is improved by using prefetch instructions to bring the data of the two loads closer to the processor before being loaded. Because the load instruction LOAD[D(y)]→R(b) is speculative, a no-fault prefetch instruction is inserted into the program code before the load instruction. A no-fault prefetch instruction instructs the processor to prefetch the data and to ignore (i.e. to not handle) any exception that results from the prefetch. For example, if a TLB miss occurs during the no-fault prefetch, the data is not transferred to the new memory location closer to the processor (such as the L0 cache). Instead, the data remains in its initial memory location (such as the L1 cache, higher level cache, or main memory).

The instruction NO_FAULT_PREFETCH[D(y)] of FIG. 2 is a no-fault prefetch instruction that instructs the processor to prefetch data from virtual address D(y) and to ignore any exceptions resulting therefrom. For one embodiment of the present invention, this no-fault prefetch instruction is inserted into the program code by a programmer. For another embodiment, this instruction is inserted into the program code by a compiler. After the no-fault prefetch instruction is executed, assuming no exceptions occur, the data at address D(y) is located closer to the processor so that the speculative instruction LOAD[D(y)]→R(b), if executed, is completed more quickly. If the branch that calls subroutine 201 is not taken, the load instruction is not executed. In such as case, the time delay penalty for executing the unneeded no-fault prefetch instruction is not overly lengthy because time-consuming exception handling is not performed.

Because the load instruction LOAD[D(x)]→R(a) of FIG. 2 is non-speculative, a faulting prefetch instruction is inserted into the program code before the load instruction. The instruction FAULT_PREFETCH[D(x)] is a faulting prefetch instruction that instructs the processor to prefetch data from address D(x) and to handle any exception resulting therefrom. For one embodiment of the present invention, this faulting prefetch instruction is inserted into the program code by a programmer. For another embodiment, this instruction is inserted into the program code by a compiler.

After the faulting prefetch instruction is executed, the data at address D(x) is located closer to the processor so that the non-speculative instruction LOAD[D(x)]→R(a) is completed more quickly. The time delay associated with handling any exception that results from the faulting prefetch is not wasted because the exception would have occurred anyway, even without the faulting prefetch instruction, once the processor executed the non-speculative load instruction. In accordance with an embodiment of the present invention, the data retrieval latency associated with accessing the data at address D(x) is taken earlier in the program sequence, at the prefetch stage, so that the subsequent load is executed more quickly.

In accordance with an embodiment of the present invention, the faulting prefetch instruction transfers data into a cache rather than into a register of the processor. This leaves the register free to store other data. For example, for one embodiment of the present invention, the program code of FIG. 2 includes a load instruction after the FAULT_PREFETCH[D(x)] instruction and before the LOAD[D(x)]→R(a) instruction that loads other data into register R(a). For another embodiment, the program code of FIG. 2 includes an instruction after the FAULT_PREFETCH[D(x)] instruction and before the LOAD[D(x)]→R(a) instruction that manipulates data in register R(a), such as a mathematical instruction.

After the prefetched data of address D(x) is loaded into register R(a) by load instruction LOAD[D(x)]→R(a) of FIG. 2, the processor executes the mathematical instruction ADD R(a)+R(b)→R(c). In response, the processor adds the data stored in register R(a) to the data stored in register R(b) and stores the result in register R(c). For an alternate embodiment of the present invention, the data loaded into the registers is manipulated in another way by performing an alternate mathematical operation on the data.

Figure 3:
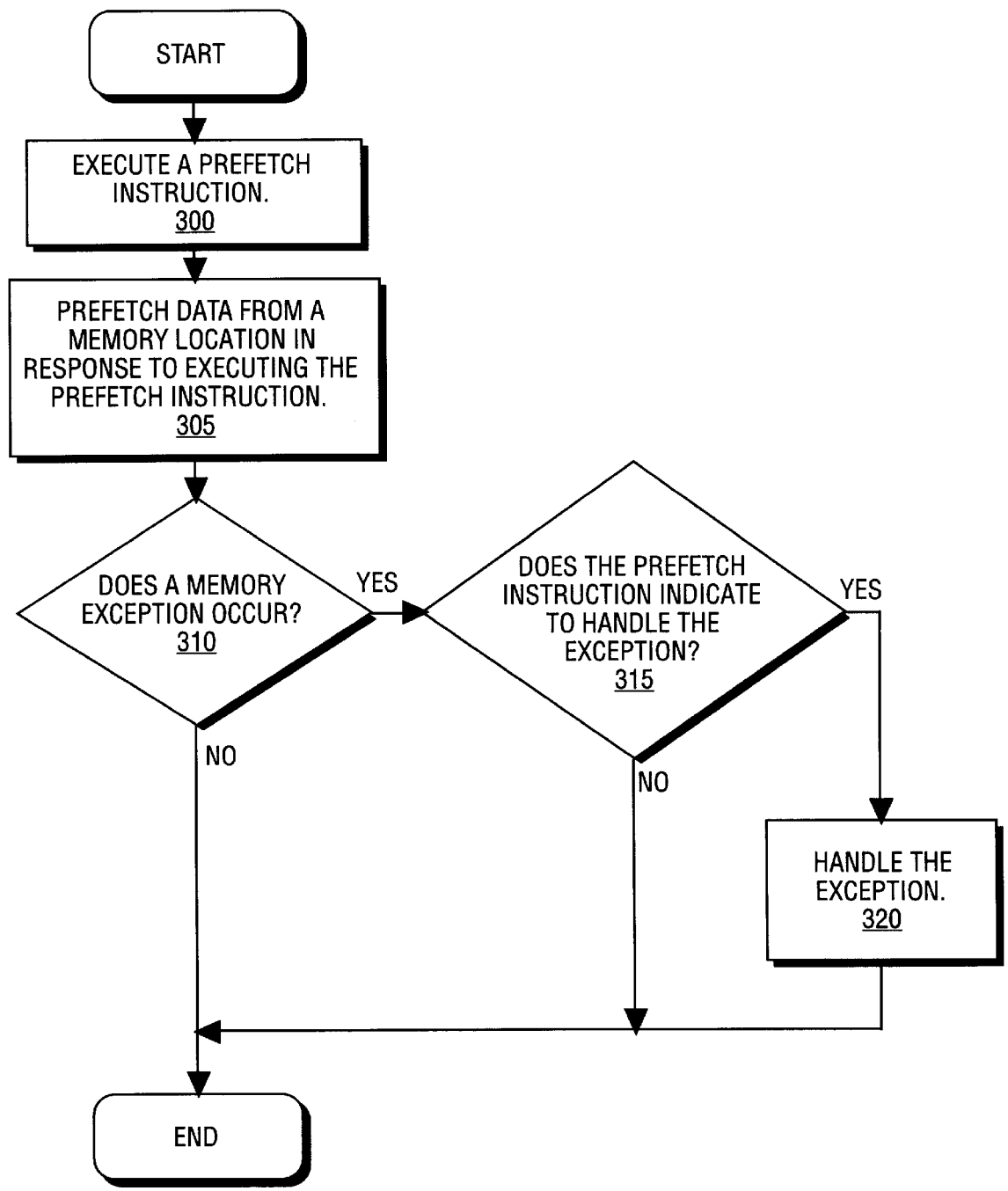
FIG. 3 is a flow chart showing a method of the present invention.

FIG. 3 is a flow chart showing a method of the present invention implemented on a computer system. At step 300 the processor of the computer system executes a prefetch instruction. The prefetch instruction is either a faulting prefetch instruction or a no-fault prefetch instruction. At step 305 data is prefetched from a memory location in response to executing the prefetch instruction.

At step 310 it is determined if a memory exception occurs during the prefetching of the data from the memory location. If no memory exception occurs, then, in accordance with the prefetch instruction, the data is transferred from the memory location to a cache located closer to the processor in the memory hierarchy of the computer system. If a memory exception does occur, the exception is handled at step 320 if the prefetch instruction indicates, at step 315, that the processor is to handle the exception (i.e. it is a faulting prefetch instruction). After the exception is handled at step 320, the data is transferred, in accordance with the prefetch instruction, from the memory location to a cache located closer to the processor in the memory hierarchy of the computer system.

Alternatively, if a memory exception occurs, as determined at step 310, and the prefetch instruction indicates, at step 315, that the processor is not to handle the exception (i.e. it is a no-fault prefetch instruction), the memory exception is ignored, and the data is not transferred from the memory location.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of manipulating data in a computer system that includes a processor, the method comprising:

executing a prefetch instruction;

prefetching data from a memory location in response to the step of executing the instruction; and determining if a memory exception occurred during the step of prefetching the data, and, if so, handling the exception if the prefetch instruction indicates to do so.

2. The method of claim 1, further comprising:

storing the data in a first cache; and loading the data from the first cache into a register of the processor.

3. The method of claim 2, further comprising taking a branch after storing the data and before loading the data.

4. The method of claim 2, further comprising loading interim data into the register after storing the data in the first cache and before loading the data into the register.

5. The method of claim 1, wherein prefetching the data transfers the data from main memory of the computer system.

6. The method of claim 2, wherein prefetching the data transfers the data from a second cache that is further from the processor in a memory hierarchy of the computer system than the first cache.

7. The method of claim 1, wherein the memory exception is a translation lookaside buffer (TLB) miss and handling the exception includes updating the TLB.

8. The method of claim 2, wherein storing the data in the first cache stores the data in an L0 cache.

9. A method of manipulating data in a computer system that includes a processor, the method comprising:

executing a faulting prefetch instruction;

prefetching first data from a memory location and handling an exception resulting therefrom in response to executing the faulting prefetch instruction;

executing a no-fault prefetch instruction; and prefetching second data from a memory location and ignoring an exception resulting therefrom in response to executing the no-fault prefetch instruction.

10. The method of claim 9, further comprising:

storing the first data in a first cache in response to executing the faulting prefetch instruction;

executing a first load instruction; and loading the first data from the first cache into a register of the processor in response to executing the first load instruction.

11. The method of claim 10, further comprising executing a branch instruction after executing the faulting prefetch instruction and before executing the first load instruction.

12. The method of claim 10, further comprising executing a second load instruction that instructs the processor to load interim data from the first cache into the register of the processor after executing the faulting prefetch instruction and before executing the first load instruction.

13. A processor having an instruction set associated therewith, the instruction set including a first instruction that, when executed by the processor, causes the processor to:

prefetch first data from a memory location;

determine if a memory exception occurs in response to prefetching the first data and, if so, handle the exception; and store the first data in a first cache; and the instruction set including a second instruction that, when executed by the processor, causes the processor to:

prefetch second data from a memory location; and determine if a memory exception occurs in response to prefetching the second data and, if so, ignore the exception.

14. The processor of claim 13, wherein the memory location is a second cache that is further from the processor in a memory hierarchy of a computer system than the first cache.

15. The processor of claim 13, wherein the memory exception is a translation lookaside buffer (TLB) miss and handling the exception includes updating the TLB.

16. An electronic storage medium having program code stored thereon, the program code, when executed by a processor in a computer system, causing the computer system to:

prefetch data from a first memory location and handle a memory exception resulting therefrom;

store the data in a first cache; and prefetch data from a second memory location and ignore a memory exception resulting therefrom.

17. The storage medium of claim 16, wherein prefetching includes prefetching data from a main memory of the computer system.

18. The storage medium of claim 16, wherein prefetching includes prefetching data from a second cache that is further from the processor in a memory hierarchy of the computer system than the first cache.

* * * * *